(12) United States Patent
Sun

(10) Patent No.: US 8,361,315 B2
(45) Date of Patent: Jan. 29, 2013

(54) FILTRATION AND AIR SUPPLY DEVICE USED IN AN AQUATIC EQUIPMENT

(76) Inventor: Cai Sun, Guangdong Province (CN)

( * ) Notice: Subject to any disclaimer, the term of this patent is extended or adjusted under 35 U.S.C. 154(b) by 425 days.

(21) Appl. No.: 12/763,192

(22) Filed: Apr. 19, 2010

(65) Prior Publication Data

US 2011/0253610 A1 Oct. 20, 2011

(51) Int. Cl.
*A01K 63/04* (2006.01)
(52) U.S. Cl. .................... 210/167.26; 119/261
(58) Field of Classification Search ............. 210/167.21, 210/167.24, 167.25, 167.26; 119/261
See application file for complete search history.

(56) References Cited

U.S. PATENT DOCUMENTS

| | | | | |
|---|---|---|---|---|
| 4,272,372 A * | 6/1981 | Fonseca | .................... | 210/167.25 |
| 4,481,905 A * | 11/1984 | Fonseca | ........................ | 119/261 |
| 4,703,720 A * | 11/1987 | Shipman et al. | .............. | 119/261 |
| 4,994,177 A * | 2/1991 | Bogar, Jr. | .................. | 210/167.01 |
| 5,336,401 A * | 8/1994 | Tu | ............................. | 210/167.26 |
| 6,041,740 A * | 3/2000 | Newman | ........................ | 119/261 |
| 7,484,476 B2 * | 2/2009 | Stafford | ........................ | 119/261 |
| 7,931,801 B2 * | 4/2011 | Wang | ........................ | 210/167.23 |
| 2009/0120859 A1 * | 5/2009 | Tsai | ........................ | 210/167.26 |
| 2009/0126645 A1 * | 5/2009 | Tsai | ........................ | 119/261 |

* cited by examiner

*Primary Examiner* — Fred Prince

(57) ABSTRACT

A filtration and air supply device(3) used in an aquatic equipment(2), comprising filtration system with air supply, including filtration box(31), water pump(33), filter cartridge(32), air pump(7), air inlet tube(8), air duct(36). The characteristics of this filtration and air supply device(3) are: Said filtration and air supply device(3) locates inside the aquatic equipment(2). Box wall(310) is with grids(312). Water pump(33) locates in one side of the filtration box(31), and filter cartridge(32) locates in the other side of the filtration box(31). Bottom slab(9) is equipped with air inlet hole(38) and water pump power cord inlet hole(40). The bottom of air inlet hole(38) connects the air pump(7) through air inlet tube(8). The upper part of air inlet hole(38) connects air outlet hole (318) through air duct(36). No-return valve(37) locates between air duct (36) and air outlet hole(318). Outside of the air outlet hole (318) is equipped with air filter hood(315).

8 Claims, 7 Drawing Sheets

FILTRATION AND AIR SUPPLY DEVICE USED IN AN AQUATIC EQUIPMENT

BACKGROUND OF THE INVENTION

This invention involves a device used in aquatic equipment which contains a filtration and air supply system, especially combines water flow filtration and air supply into one system, and locates inside the aquatic equipment.

Aquatic equipment is used for keeping aquatic animals, particularly decorative fish, normally including water container, filtration system and air supply devices. The filtration system and air supply system of the existing aquatic equipment are separated located on the upper/side/outside of water container, which are in large volume, higher cost, can not be concealed and decorated. Electrical appliances, power cord and air tube are normally located inside or outside the water container, which made it look tangling and not nice, hard to clean and replace.

BRIEF SUMMARY OF THE INVENTION

In view of this, this invention is intending to solve the above mentioned technology problems, offering a environment friendly, orderly, clean, nice device which combines filtration system with air supply.

The technical solution of this invention used in aquatic equipment(2) is: Said filtration and air supply device(3) comprises filtration system with air supply, including filtration box(31), water pump(33), filter cartridge(32), air pump(7), air inlet tube(8), air duct(36). The characteristics of this filtration and air supply device(3) are: Said filtration and air supply device(3) locates inside the aquatic equipment(2). Box wall(310) is with grids(312). Water pump(33) locates in one side of the filtration box(31), and filter cartridge(32) locates in the other side of the filtration box(31). Bottom slab(9) is equipped with air inlet hole(38) and water pump power cord inlet hole(40). The bottom of air inlet hole(38) connects the air pump(7) through air inlet tube(8). The upper part of air inlet hole(38) connects air outlet hole(318) through air duct(36). No-return valve(37) locates between air duct (36) and air outlet hole(318). Outside of the air outlet hole (318) is equipped with air filter hood(315).

Said water pump(33) uses low voltage safe power source; bottom of said water pump(33) is equipped with anti-shock mat(331) and water pump inlet(332); top of said water pump (33) is equipped with water pump outlet(333); anti-shock mat(331) and bottom slab(9) set plenty space for water inlet.

Said filter cartridge(32) is including carbon room(321), sponge room(322), filter cartridge cover(324). Said carbon room(321) contains activated carbon, said sponge room(322) contains sponge. Said filter cartridge cover(324) and cartridge wall(329) are equipped with filter cartridge grids(326). Said filter cartridge(32) outsides are equipped with fix chimb (327), filter cartridge cover(324) insides are equipped with fix groove(328). Said fix chimb(327) can go into the fix groove (328), so as to make the filter cartridge(32) fix with the filter cartridge cover(324). Said filter cartridge cover(324) outsides are equipped with fix claw(325).

Inner bottom(319) of said filtration box(31) is equipped with hole cover(316). Outer bottom(320) of said filtration box(31) is equipped with anti-leaking groove(35), anti-leaking ring(4) and screw hole(34). One side of said filtration box(31) which inside locates the said water pump(33) is equipped with the filtration box cover(314). Said filtration box(31) upper outsides are equipped with fix lobe(311). Said fix lobe(311) can be occluded with fix claw(325) which locates on the outside of filter cartridge cover(324), so as to make the filter cartridge (32) fix with the filtration box(31).

One side of said hole cover(316) is equipped with the cord groove(41) for placing the water pump power cord(6). Said hole cover(316) is fixed with hole cover screw(317).

Said filtration box cover(314) is equipped with water outlet guide(313) which contains water pump outlet(333). Bottom of said filtration box cover(314) is fixed with filtration box cover screw hole(39).

Said filtration box(31) fixes with base(5) via screw hole (34).

Said air filter hood(315) is equipped with a number of air filter hole(10). Said air filter hood(315) is built in the inner bottom of filtration box(31) and connects with the air outlet hole(318).

This invention comprises filtration system with air supply efficiently, specially with low cost, energy saving, super safety, environmental friendly, which makes the aquatic equipment more clean, nice and easy care, optimize the living environment of the aquatic plants and animals with a harmony visual effect.

Figure 1:
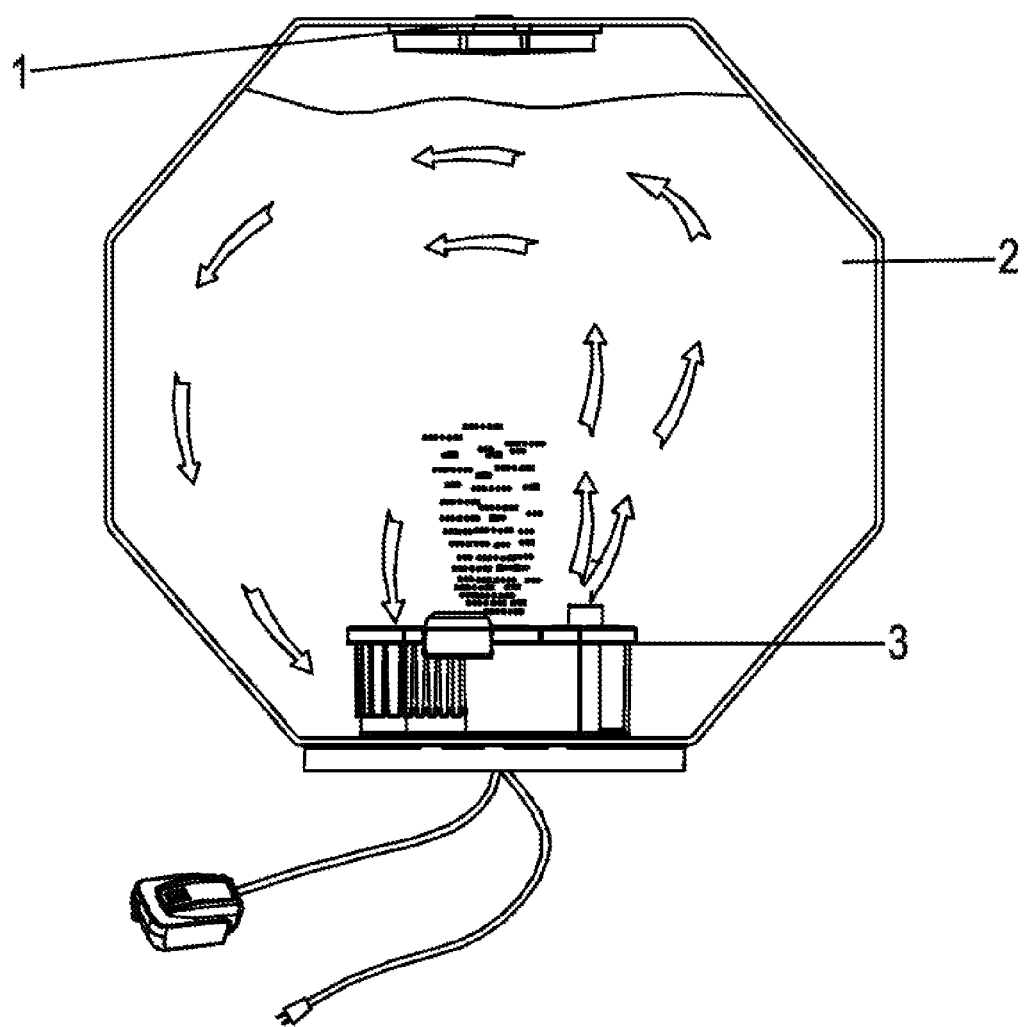
FIG. 1: the using mode of the device located inside the aquatic equipment with filtration and air supply.
Figure 2:
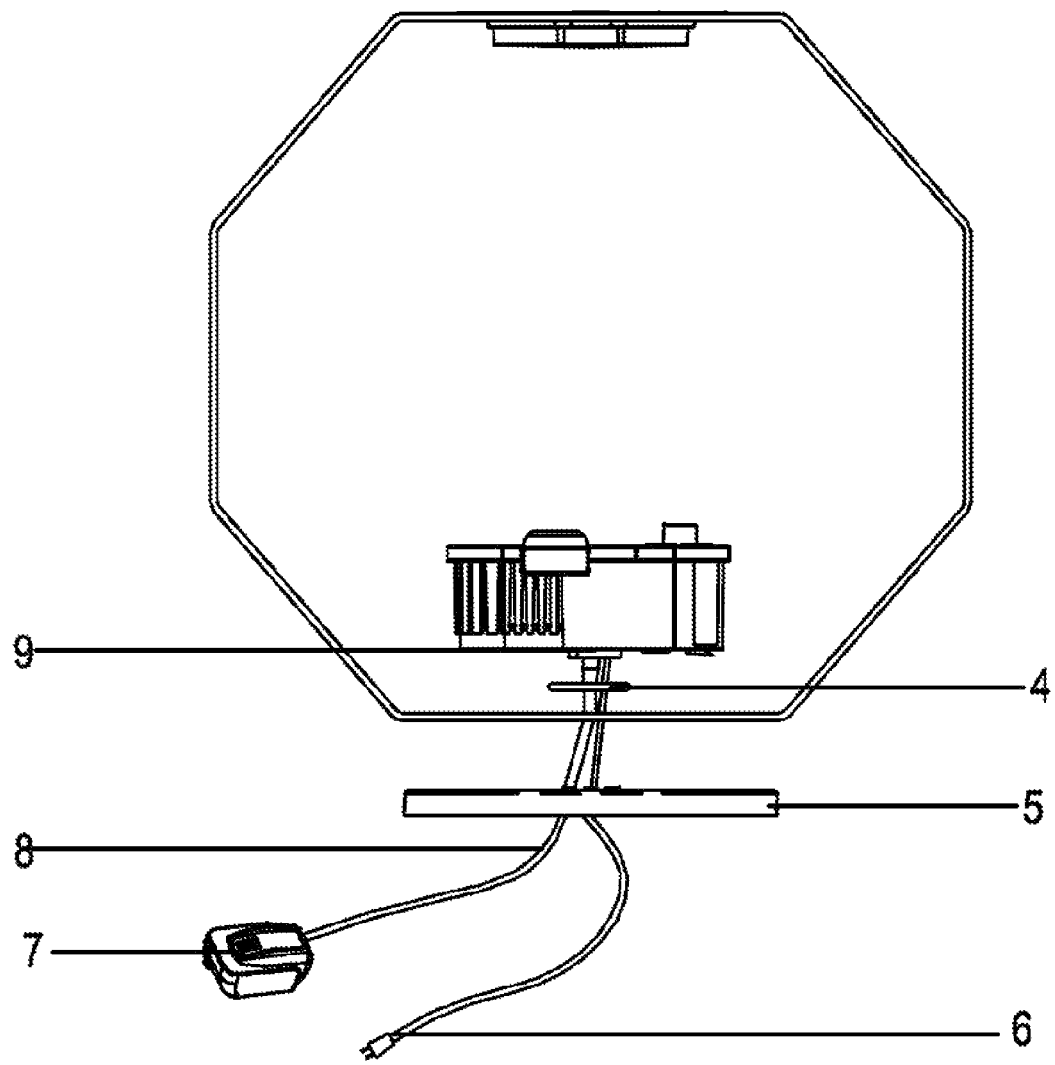
FIG. 2: installation structure of the device located inside the aquatic equipment with filtration and air supply.
Figure 3:
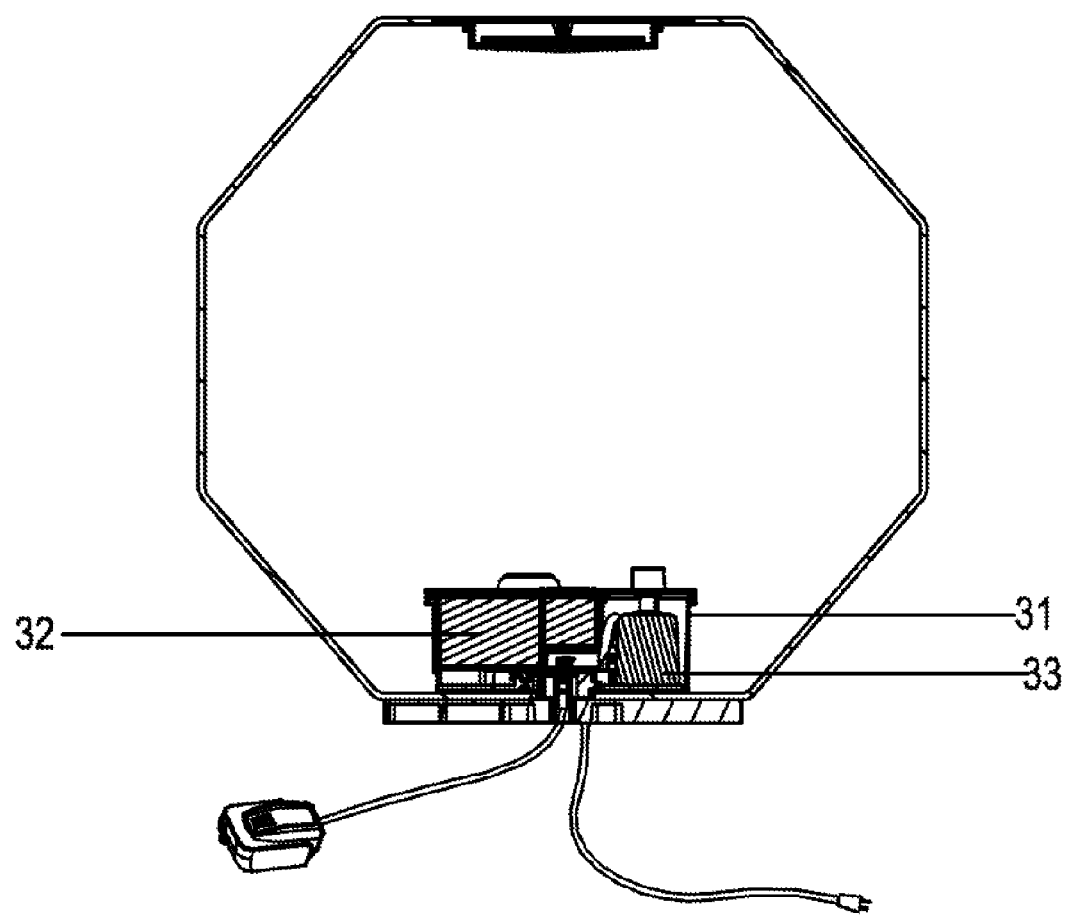
FIG. 3: installation structure cutaway view of the device located inside the aquatic equipment with filtration and air supply.
Figure 4:
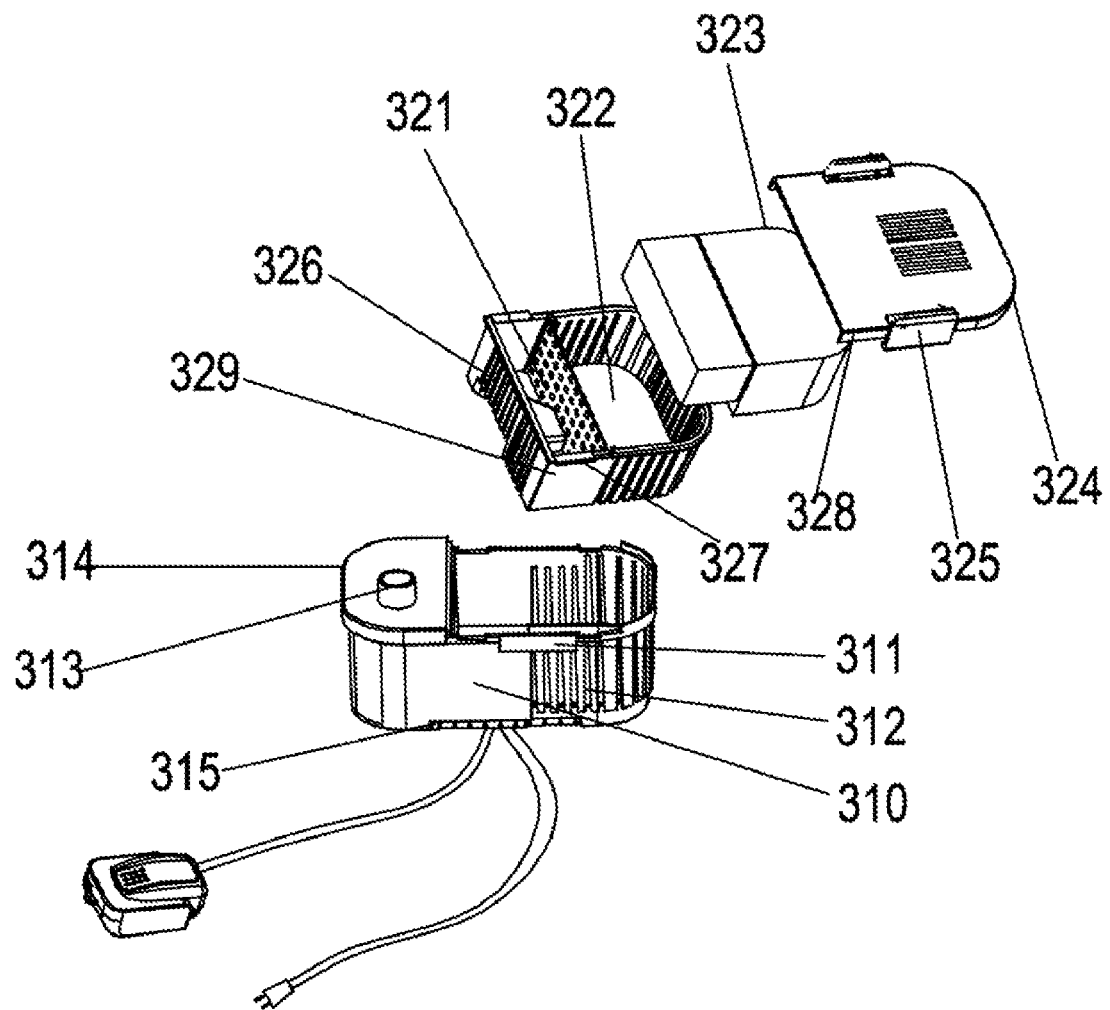
FIG. 4: structure exploded view of the device located inside the aquatic equipment with filtration and air supply.
Figure 5:
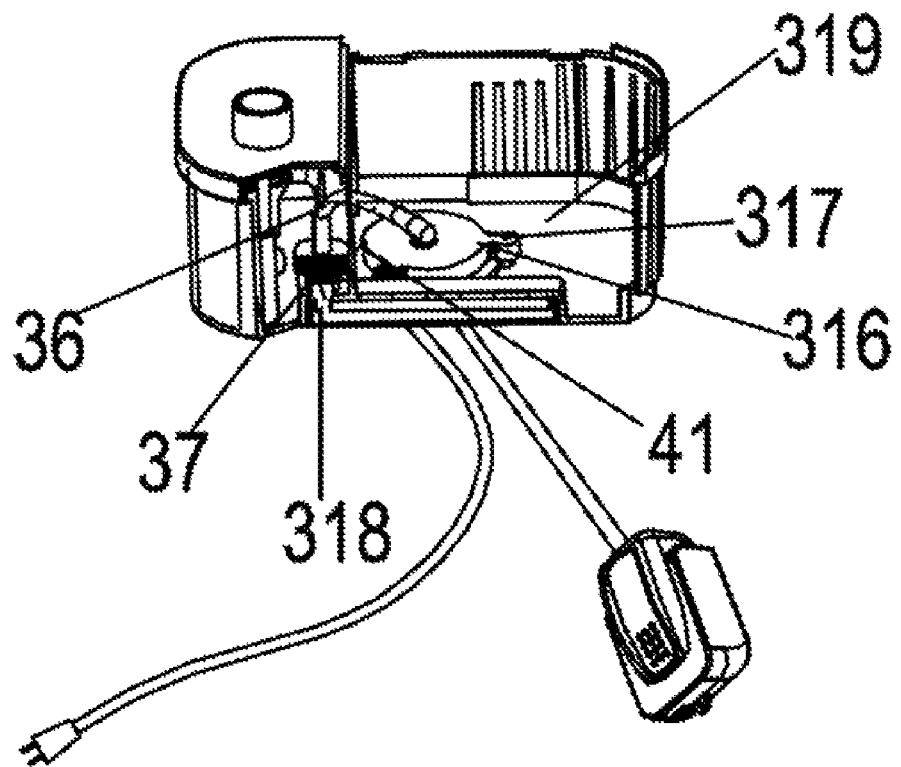
FIG. 5: filtration box internal structure cutaway view of the device located inside the aquatic equipment with filtration and air supply.
Figure 6:
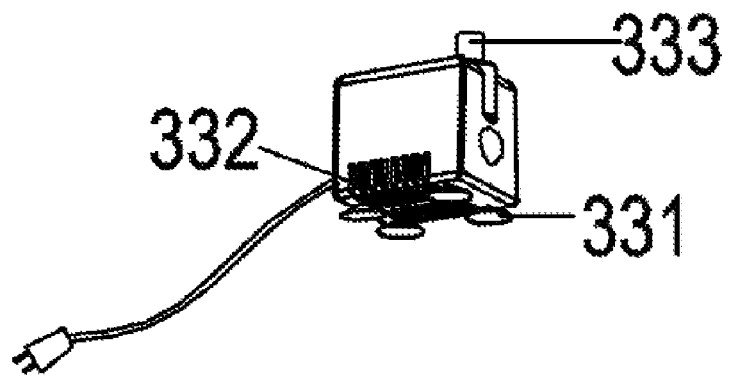
FIG. 6: water pump structure view of the device located inside the aquatic equipment with filtration and air supply.
Figure 7:
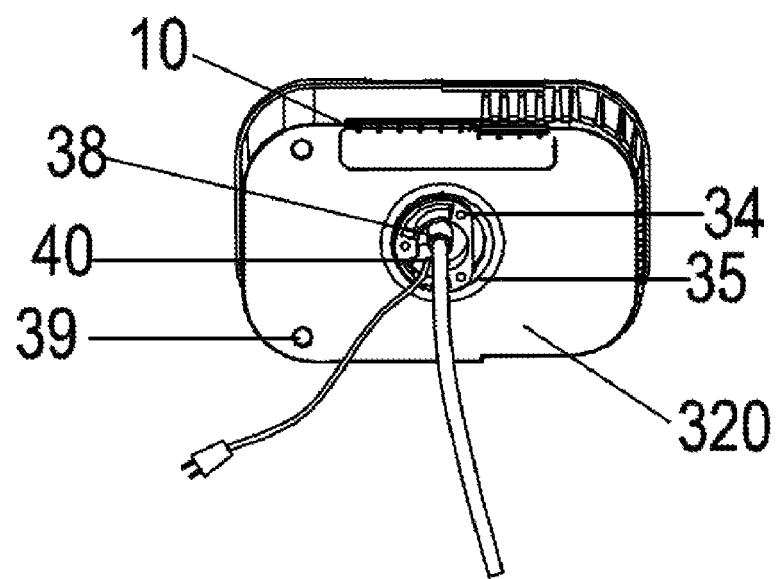
FIG. 7: filtration box bottom structure view of the device located inside the aquatic equipment with filtration and air supply.

| Explanation of Figure | | | |
|---|---|---|---|
| 1 | lid | 2 | aquatic equipment |
| 3 | filtration and air supply device | 31 | filtration box |
| 310 | box wall | 311 | fix lobe |
| 312 | grids | 313 | water outlet guide |
| 314 | filtration box cover | 315 | air filter hood |
| 316 | hole cover | 317 | hole cover screw |
| 318 | air outlet hole | 319 | inner bottom |
| 320 | outer bottom | 32 | filter cartridge |
| 321 | carbon room | 322 | sponge room |
| 323 | sponge | 324 | filter cartridge cover |
| 325 | fix claw | 326 | filter cartridge grids |
| 327 | fix chimb | 328 | fix groove |
| 329 | cartridge wall | 33 | water pump |
| 331 | anti-shock mat | 332 | water pump inlet |
| 333 | water pump outlet | 34 | screw hole |
| 35 | anti-leaking groove | 36 | air duct |
| 37 | no-return valve | 38 | air inlet hole |
| 39 | filtration box cover screw hole | 40 | water pump power cord inlet hole |

-continued

Explanation of Figure

| 41 | cord groove | 4 | anti-leaking ring |
| 5 | base | 6 | water pump power cord |
| 7 | air pump | 8 | air inlet tube |
| 9 | bottom slab | 10 | air filter hole |

DETAILED DESCRIPTION OF THE INVENTION

This invention embodiment shown in FIG. 1-7, bring forward a filtration and air supply device(3) used in aquatic equipment(2). Said filtration and air supply device(3) comprises filtration system with air supply, including filtration box(31), water pump(33), filter cartridge(32), air pump(7), air inlet tube(8), air duct(36).

The keystone of this invention is: Said filtration and air supply device(3) locates inside the aquatic equipment(2). Box wall(310) is with grids(312). Water pump(33) locates in one side of the filtration box(31), and filter cartridge(32) locates in the other side of the filtration box(31). Bottom slab(9) is equipped with air inlet hole(38) and water pump power cord inlet hole(40). The bottom of air inlet hole(38) connects the air pump(7) through air inlet tube(8). The upper part of air inlet hole(38) connects air outlet hole (318) through air duct(36). No-return valve(37) locates between air duct (36) and air outlet hole(318). Outside of the air outlet hole (318) is equipped with air filter hood(315).

Said water pump(33) uses low voltage safe power source; bottom of said water pump(33) is equipped with anti-shock mat(331) and water pump inlet(332); top of said water pump (33) is equipped with water pump outlet(333); anti-shock mat(331) and bottom slab(9) set plenty space for water inlet. said filter cartridge(32) is including carbon room(321), sponge room(322), filter cartridge cover(324). Said carbon room(321) contains activated carbon, said sponge room(322) contains sponge. Said filter cartridge cover(324) and cartridge wall(329) are equipped with filter cartridge grids(326). Said filter cartridge(32) outsides are equipped with fix chimb (327), filter cartridge cover(324) insides are equipped with fix groove(328). Said fix chimb(327) can go into the fix groove (328), so as to make the filter cartridge(32) fix with the filter cartridge cover(324). Said filter cartridge cover(324) outsides are equipped with fix claw(325). inner bottom(319) of said filtration box(31) is equipped with hole cover(316). Outer bottom(320) of said filtration box(31) is equipped with anti-leaking groove(35), anti-leaking ring(4) and screw hole(34). One side of said filtration box(31) which inside locates the said water pump(33) is equipped with the filtration box cover (314). Said filtration box(31) upper outsides are equipped with fix lobe(311). Said fix lobe(311) can be occluded with fix claw(325) which locates on the outside of filter cartridge cover(324), so as to make the filter cartridge (32) fix with the filtration box(31). One side of said hole cover(316) is equipped with the cord groove(41) for placing the water pump power cord(6). Said hole cover(316) is fixed with hole cover screw(317). Said filtration box cover(314) is equipped with water outlet guide(313) which contains water pump outlet(333). Bottom of said filtration box cover(314) is fixed with filtration box cover screw hole(39). Said filtration box (31) fixes with base(5) via screw hole(34). Said air filter hood(315) is equipped with a number of air filter hole(10). Said air filter hood(315) is built in the inner bottom of filtration box(31) and connects with the air outlet hole(318).

Figure 8:
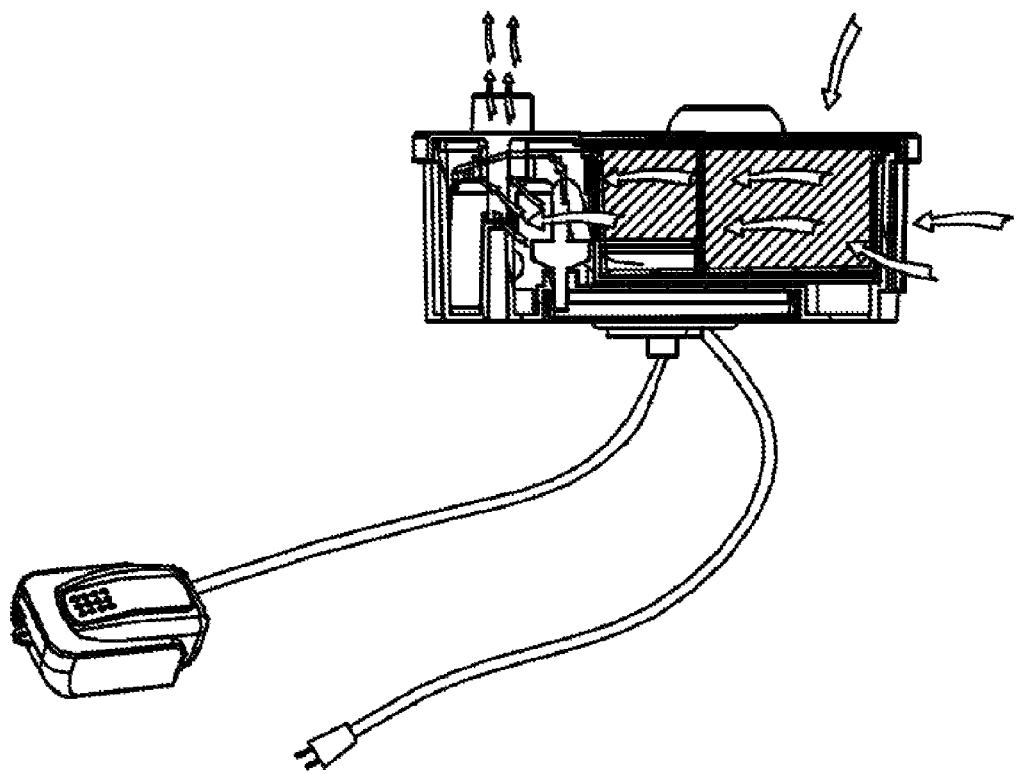
FIG. 8: water flow filtration recycle view of the device located inside the aquatic equipment with filtration and air supply.
Figure 9:
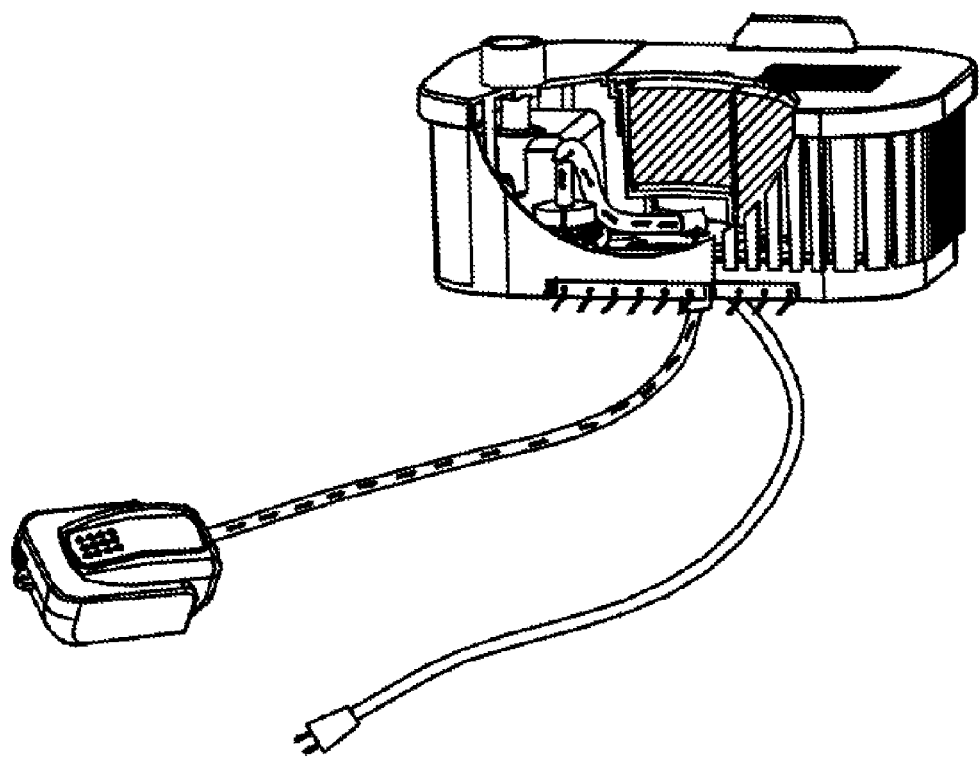
FIG. 9: air flow way of the device located inside the aquatic equipment with filtration and air supply.

In this invention embodiment as shown in FIG. 1, FIG. 8 and FIG. 9, place the filtration and air supply device(3) inside the aquatic equipment(2) from the lid(1), fix the screw hole (34) with the base(5) of the aquatic equipment(2), connect the water pump power cord(6) to the power source, then the water pump(33) can go working normally. With the water absorption and water drainage by the water pump(33), the water flow inside the aquatic equipment(2) goes inside grids(312) and filter cartridge grids(326), go through carbon room(321) and sponge room(322) of the filter cartridge(32), then goes into water pump inlet(332) of the water pump(33), and goes out from water pump outlet(333). From this water flow filtration cycle, the water inside the aquatic equipment(2) can be kept clean. To replace the filter cartridge(32), hold the fix claw (325), and make the fix claw(325) separate from the fix lobe (311), then take filter cartridge(32) out so as to clean the filter cartridge(32). The anti-shock mat(331) locates at the bottom of the water pump(33) which uses low voltage safe power source, so as to efficiently lower the water pump(33) shocking and working noise, optimize the environment inside the aquatic equipment(2), lower the energy consumption and raise the safety. Air brought by the air pump(7) comes from air inlet tube(8) and air inlet hole(38), goes through air duct(36) and no-return valve(37), goes out from air outlet hole(318) to the air filter hood(315), then evenly discharges inside the aquatic equipment(2) by the said air filter hood(315). In this invention embodiment, combing the filtration system with air supply system efficiently, then no tube or line could be seen inside the aquatic equipment(2), specially with low cost, energy saving, super safety, environmental friendly, which makes the aquatic equipment more clean, nice and easy care, optimize the living environment of the aquatic plants and animals with a harmony visual effect.

The invention is not limited to the specific details described in the above embodiment and figures, which is given as an example only, and various devices, structures and characteristics similar to this invention are within the scope of this invention.

I claim:

1. A filtration and air supply device(3) used in an aquatic equipment(2); said filtration and air supply device(3) comprises filtration system with air supply, including filtration box(31), water pump(33), filter cartridge(32), air pump(7), air inlet tube(8), air duct(36); the characteristics of this filtration and air supply device(3) are: said filtration and air supply device(3) locates inside the aquatic equipment(2); box wall (310) is with grids(312); water pump(33) locates in one side of the filtration box(31), and filter cartridge(32) locates in the other side of the filtration box(31); bottom slab(9) is equipped with air inlet hole(38) and water pump power cord inlet hole(40); the bottom of air inlet hole(38) connects the air pump(7) through air inlet tube(8); the upper part of air inlet hole(38) connects air outlet hole (318) through air duct(36) no-return valve(37) locates between air duct(36) and air outlet hole(318); outside of the air outlet hole(318) is equipped with air filter hood(315).

2. Said filtration and air supply device(3) used in an aquatic equipment(2)as claimed in claim 1, wherein the characteristics of this filtration and air supply device(3) is: said water pump(33) uses low voltage safe power source; bottom of said water pump(33) is equipped with anti-shock mat(331) and water pump inlet(332); top of said water pump(33) is equipped with water pump outlet(333); anti-shock mat(331) and bottom slab(9) set plenty space for water inlet.

3. Said filtration and air supply device(3) used in an aquatic equipment(2)as claimed in claim 1, wherein the characteristics of this filtration and air supply device(3) is: said filter cartridge(32) is including carbon room(321), sponge room (322), filter cartridge cover(324); said carbon room(321) contains activated carbon, said sponge room(322) contains sponge; said filter cartridge cover(324) and cartridge wall (329) are equipped with filter cartridge grids(326); said filter cartridge(32) outsides are equipped with fix chimb(327), filter cartridge cover(324) insides are equipped with fix groove (328); said fix chimb(327) can go into the fix groove(328), so as to make the filter cartridge(32) fix with the filter cartridge cover(324); said filter cartridge cover(324) outsides are equipped with fix claw(325).

4. Said filtration and air supply device(3) used in an aquatic equipment(2)as claimed in claim 1, wherein the characteristics of this filtration and air supply device(3) is: inner bottom (319) of said filtration box(31) is equipped with hole cover (316); outer bottom(320) of said filtration box(31) is equipped with anti-leaking groove(35), anti-leaking ring(4) and screw hole(34); one side of said filtration box(31) which inside locates the said water pump(33) is equipped with the filtration box cover(314); said filtration box(31) upper outsides are equipped with fix lobe(311); said fix lobe(311) can be occluded with fix claw(325) which locates on the outside of filter cartridge cover(324), so as to make the filter cartridge (32) fix with the filtration box(31).

5. Said filtration and air supply device(3)used in an aquatic equipment(2)as claimed in claim 1, wherein the characteristics of this filtration and air supply device(3) is: one side of said hole cover(316) is equipped with the cord groove(41) for placing the water pump power cord(6); said hole cover(316) is fixed with hole cover screw(317).

6. Said filtration and air supply device(3)used in an aquatic equipment(2)as claimed in claim 1, wherein the characteristics of this filtration and air supply device(3) is: said filtration box cover(314) is equipped with water outlet guide(313) which contains water pump outlet(333); bottom of said filtration box cover(314) is fixed with filtration box cover screw hole(39).

7. Said filtration and air supply device(3)used in an aquatic equipment(2)as claimed in claim 1, wherein the characteristics of this filtration and air supply device(3) is: said filtration box(31) fixes with base(5) via screw hole(34).

8. Said filtration and air supply device(3)used in an aquatic equipment(2)as claimed in claim 1, wherein the characteristics of this filtration and air supply device(3) is: said air filter hood(315) is equipped with a number of air filter hole(10); said air filter hood(315) is built in the inner bottom of filtration box(31) and connects with the air outlet hole(318).

\* \* \* \* \*